3,810,892
TRICHLOROISOCYANURIC ACID MANUFACTURE
Raymond N. Mesiah, Somerset, N.J., Harold R. Chancey, Charleston, W. Va., and Milton Cohen, Old Bridge, N.J., assignors to FMC Corporation, New York, N.Y.
Filed Sept. 14, 1971, Ser. No. 180,437
Int. Cl. C07d 55/42
U.S. Cl. 260—248 C                   6 Claims

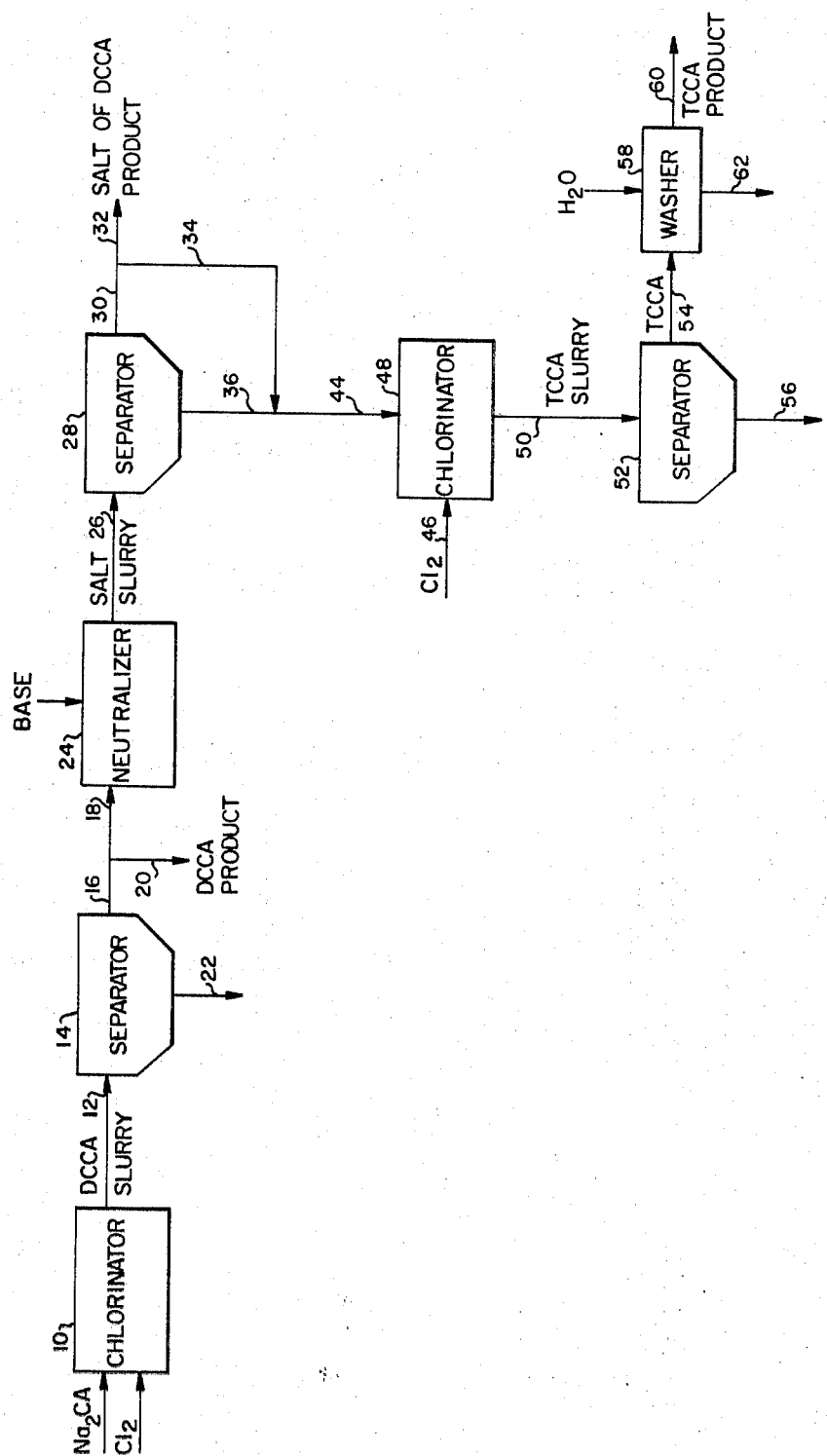

ABSTRACT OF THE DISCLOSURE

A process is provided for producing trichloroisocyanuric acid by chlorinating a salt of dichloroisocyanuric acid in an aqueous mixture to a pH of between 2.5 and 3.5, at a temperature of at least 0° C. and preferably about 15° C. to 20° C. The aqueous mixture containing a salt of dichloroisocyanuric acid can be an effluent from the production of the salt. Furthermore, a process for producing dichloroisocyanuric acid, a salt of dichloroisocyanuric acid and trichloroisocyanuric acid in any desired proportions is provided.

---

Trichloroisocyanuric acid, also commonly known as trichlorocyanuric acid, is a commercial product having many known uses. This invention makes it possible to produce trichloroisocyanuric acid by a process which is adaptable to processes currently employed for producing salts of dichloroisocyanuric acid, utilizing a troublesome effluent of the salt process as a reactant for the production of trichloroisocyanuric acid.

Trichloroisocyanuric acid is commonly produced by chlorinating the trisodium salt of cyanuric acid. This chlorination process is extremely exothermic. The trisodium salt is normally obtained by reacting cyanuric acid and sodium hydroxide in a molar ratio of about 1.0 to 3.0. Dichloroisocyanuric acid is similarly produced by chlorinating the disodium salt of cyanuric acid; the disodium salt is produced by reacting cyanuric acid and sodium hydroxide in a molar ratio of about 1.0 moles of cyanuric acid to 2.0 moles of sodium hydroxide.

The same production equipment is commonly employed commercially for the alternate production of both di- and trichloroisocyanuric acids since the reactions for producing both the di- and trichloroisocyanuric acids normally employ the same chemical reactants but in different proportions. Alternating between the production of di- and trichloroisocyanuric acids requires process shutdowns or changeovers with their inherent problems. It would be advantageous if a single process could be devised to produce both products without the necessity of process shutdowns or changeovers to alternate between products.

Salts of dichloroisocyanuric acid are valuable commercial products which are usually produced by neutralizing dichloroisocyanuric acid with a suitable base such as sodium hydroxide or potassium hydroxide. Neutralizing the acid results in a salt slurry which is separated into a supernatant liquid and a solid salt of dichloroisocyanuric acid. The supernatant liquid is an aqueous solution which is essentially saturated with the salt (about 10% to 15% by weight of the solution).

This supernatant liquid containing about 10% to 15% dissolved salt was previously utilized by such methods as direct recycling or by converting the salt into cyanuric acid and chlorine by acidifying and steam stripping the supernatant liquid and then recycling the cyanuric acid and chlorine so obtained. However, these recovery methods have not been completely acceptable in that recycling interferes with the control of the process while recovering the chemical components values of the salt by acidifying and steam stripping is not very efficient and is beset with operating problems.

In accordance with the present invention an aqueous mixture containing a salt of dichloroisocyanuric acid can be used to produce trichloroisocyanuric acid by chlorinating the aqueous mixture to a pH between 2.5 and 3.5, at a temperature of at least 0° C. and preferably 15° to 20° C. The process provided by this invention represents a substantial improvement in a process for producing salts of dichloroisocyanuric acid in that a trouble some effluent from the production of the salt is efficiently utilized without process control problems or any loss of cyanurate values, chlorine or caustic by using the effluent as a feed for the production of trichloroisocyanuric acid. An additional improvement is that dichloroisocyanuric acid, salts of dichloroisocyanuric acid and trichloroisocyanuric acid can be sequentially produced in any desired proportions without process shutdowns.

The figure is a schematic representation of our invention. It depicts a process for sequentially producing dichloroisocyanuric acid, salts of dichloroisocyanuric acid and trichloroisocyanuric acid in any desired proportions.

Trichloroisocyanuric acid is produced by the process of this invention by chlorinating an aqueous mixture containing a salt of dichloroisocyanuric acid to a pH between 2.5 and 3.5 and at a temperature of at least 0° C.

The reactant can be any water-soluble salt of dichloroisocyanuric acid, the more common of which are sodium dichloroisocyanurate and potassium dichloroisocyanurate although other salts having solubility in water of at least about 5%, for example calcium di(dichloroisocyanurate) or lithium dichloroisocyanurate may be used. The reaction is not appreciably affected by the concentration of the salt in the aqueous solution. However, the process is most economical when the salt concentration is close to saturation and therefore an approximately saturated solution is preferred. The salt of dichloroisocyanuric acid to be reacted can be present in solution with trichloroisocyanuric acid, and can be in any proportion to the trichloroisocyanuric acid.

For chlorinating the aqueous salt solution either gaseous or liquid chlorine can be employed. The added expense of using liquid chlorine is somewhat compensated for by the reduction in the amount of heat that must be removed from the reaction.

Decomposition of dichloroisocyanurate values begins to take place at temperatures above 30° C., which decreases process efficiency. The preferred operating temperature is between 0° C. and 30° C. with 15° C. to 20° C. being particularly preferred.

Since the chlorination reaction provided by this invention is substantially less exothermic than the chlorination of the trisodium salt of cyanuric acid, relatively smaller heat exchangers are required to prevent process temperatures from rising much above 30° C. Furthermore, employing liquid chlorine eliminates the need for heat exchangers.

Trichloroisocyanuric acid is obtained as a precipitate in an aqueous slurry after chlorination. The precipitated trichloroisocyanuric acid is usually recovered by filtration, followed by washing and drying the solid to obtain a substantially pure product. Alternatively, the aqueous slurry containing the trichloroisocyanuric acid precipitate can be further processed or utilized directly.

In the production of salts of dichloroisocyanuric acid, an effluent stream is usually obtained that is about saturated with the salt. The recovery of this dissolved salt in the effluent stream has presented process problems which are eliminated by using this effluent as a reactant in the process of this invention. In addition to eliminating serious difficulties in the production of salts of dichloroisocyanuric acid such use of the effluent represents a convenient source of reactants for the process provided by this invention. Therefore, the process of this invention can be used to substantially improve a dichloroisocyanurate production process.

Furthermore, both trichloroisocyanuric acid and salts of dichloroisocyanuric acid can be produced from one overall process which can be run continuously to provide at will, varying proportions of dichloroisocyanuric acid, salts of dichloroisocyanuric acid and trichloroisocyanuric acid. Since the trichloroisocyanuric acid is produced directly from the salt of dichloroisocyanuric acid, there is eliminated the need for two production operations or a single production operation with process shutdowns required to alternate between di- and trichloroisocyanuric acid compounds.

PROCESS EXAMPLE

For example and with reference to the figure, dichloroisocyanuric acid is produced in chlorinator 10 by reacting the disodium salt of cyanuric acid ($Na_2CA$) and chlorine ($Cl_2$) according to known methods. A dichloroisocyanuric acid (DCCA) slurry, 12, is obtained from chlorinator 10 and is separated in separator 14 into solid dichloroisocyanuric acid (DCCA) 16 and a liquid effluent 22 which is usually discarded. The solid dichloroisocyanuric acid 16 is divided into two portions, 18 and 20. Portion 20 is recovered as product while portion 18 is further processed by being neutralized in neutralizer 24 with a suitable base to produce an aqueous slurry 26 containing a salt of dichloroisocyanuric acid. This aqueous slurry 26 is separated in separator 28 to produce an aqueous effluent 36 about saturated with the salt of dichloroisocyanuric acid and a solid salt of dichloroisocyanuric acid 30. The solid salt, 30, is apportioned between a portion 32, recovered as product and a portion 34 which is converted into trichloroisocyanuric acid (TCCA) in chlorinator 48.

An aqueous mixture 44 containing a salt of dichloroisocyanuric acid is fed into chlorinator 48. Controlling the amount of salt in mixture 44 regulates the amount of trichloroisocyanuric acid product. The quantity of salt in mixture 44 is controlled by regulating the amount of salt 34 obtained from the apportioning of salt 30 and the portion of effluent 36 fed to chlorinator 48. Chlorine 46 is introduced into chlorinator 48 along with the aqueous mixture 44 containing the salt of dichloroisocyanuric acid. This chlorinator is maintained at a temperature of at least 0° C. and preferably about 15° C. to 20° C. The pH of the chlorinator contents is maintained between 2.5 and 3.5 by controlling the amount of chlorine 46 added to the chlorinator. An aqueous trichloroisocyanuric acid slurry 50 is obtained from chlorinator 48. This slurry is usually separated in separator 52 into a solid trichloroisocyanuric acid product 54 and an effluent 56. The solid product is usually washed and dried in washer 58 to yield trichloroisocyanuric acid product 60 and wash effluent 62 which is discarded.

The process exempliled above sequentially produces: (1) dichloroisocyanuric acid from a disodium salt of cyanuric acid and chlorine, (2) a salt of dichloroisocyanuric acid by neutralizing some or all of the dichloroisocyanuric acid with a suitable base, and (3) trichloroisocyanuric acid by chlorinating some or all of the salt. Therefore, the combination process provided by this invention is a unique process which is capable of continuously producing dichloroisocyanuric acid, salts of dichloroisocyanuric acid and trichloroisocyanuric acid in any desired proportion. The desired proportion is usually dictated by market demand, which tends to fluctuate. This process readily adapts to these fluctuations by adjusting the proportion of dichloroisocyanuric acid that is converted into a salt of dichloroisocyanuric acid and by adjusting the proportion of the salt of dichloroisocyanuric acid that is chlorinated into trichloroisocyanuric acid. Specifically, and with reference to the figure, controlling the division of the stream 16 into the product stream 20 and the neutralizer stream 18 regulates the proportion of dichloroisocyanuric acid produced to the total amount of trichloroisocyauric acid and the salt of dichloroisocyanuric produced. Likewise, controlling both the division of the solid salt stream 30 into streams 32 and 34 and controlling the amount of effluent 36 fed into chlorinator 48 regulates the proportion of salt of dichloroisocyanuric acid obtained as product of trichloroisocyanuric acid obtained as product.

The following operating examples are provided to illustrate the chlorination of a salt of dichloroisocyanuric acid, and thereby further illustrate the invention. All proportions used herein are by weight unless otherwise specified.

EXAMPLE 1

A reactor was fitted with an ice bath, mechanical stirrer, thermometer, pH electrodes, a gas sparger tube for adding chlorine, an inlet line and an overflow port so situated as to give a normal working volume for the reactor of about 500 ml. A heel was provided in the reactor, consisting of 56 g. of trichloroisocyanuric acid, 14 g. of sodium chloride, 360 g. of water and sufficient chlorine to bring the pH of the initial charge to 3.0. Eight thousand grams of a 15% sodium dichloroisocyanurate solution (5.45 moles) was prepared and added to the reactor at a rate sufficient to obtain a 27 minute residence time in the reactor (about 18.5 ml. per minute). Simultaneously, sufficient chlorine was added to the reactor to maintain the pH of the reactor contents between 2.6 and 2.9. The reactor contents were maintained at a temperature of about 15° C. When the charge in the reactor approached about 500 ml., a slurry overflowed and was collected in a container maintained at about 11° C.

After the 8000 g. of sodium dichloroisocyanurate feed solution was consumed, the addition of chlorine was stopped and the reactor contents were combined with the product slurry. This combined slurry was filtered and the solids washed with water and dried. The net trichloroisocyanuric acid product obtained weighed 1198 g. (corrected for the amount of trichloroisocyanuric acid contained in the heel) which represents a 94.5% yield based upon the weight of sodium dichloroisocyanurate contained in the feed solution. When corrected for the solubility of trichloroisocyanuric acid in the filtrate, the total conversion of sodium dichloroisocyanurate to trichloroisocyanuric acid was approximately 100%. The washed and dried solid product analyzed about 90.5% available chlorine (theoretical value for trichloroisocyanuric acid is 91.5%).

EXAMPLE 2

The procedure of Example 1 was repeated with the exception that the feed rate of the sodium dichloroisocyanurate solution was increased sufficiently to decrease the residence time in the reactor from 27 minutes to 18 minutes. The net yield of solid trichloroisocyanuric acid was 95% (corrected for the amount of trichloroisocyanuric acid present in the heel). The solid trichloroisocyanuric acid analyzed 90.5% available chlorine.

The best mode contemplated for practicing this invention is according to the method exemplified in the Process Example with chlorinator 48 being maintained at a pH of 2.6 to 2.9 and a temperature of 15° C. to 20° C.

What is claimed is:

1. In the process of producing a salt of dichloroisocyanuric acid in which solid salt is separated and an aqueous effluent containing a dissolved salt of dichloroisocyanuric acid is obtained, and said dissolved salt contains cyanurate values which are not readily recoverable, the improvement which comprises recovering said cyanurate values by chlorinating the effluent to a pH of between 2.5 and 3.5 and at a temperature of at least 0° C. to produce a trichloroisocyanuric acid slurry.

2. The process of claim 1 in which the effluent contains sodium dichloroisocyanurate.

3. The process of claim 1 in which the effluent contains potassium dichloroisocyanurate.

4. A combination process for the continuous production of trichloroisocyanuric acid and a member selected from the group consisting of dichloroisocyanuric acid and salts of dichloroisocyanuric acid comprising, reacting cyanuric acid and a suitable base and chlorinating the product of said reaction to produce dichloroisocyanuric acid, neutralizing at least a portion of said dichloroisocyanuric acid with a suitable base to produce a salt of dichloroisocyanuric acid, separating the salt of dichloroisocyanuric acid to produce a solid salt and an aqueous effluent containing dissolved salt of dichloroisocyanuric acid, and chlorinating the effluent containing dissolved salt of dichloroisocyanuric acid to a pH of between 2.5 and 3.5 and at a temperature of at least 0° C. to produce a trichloroisocyanuric acid slurry.

5. The process of claim 4 in which the salt of dichloroisocyanuric acid is sodium dichloroisocyanurate.

6. The process of claim 4 in which the salt of dichloroisocyanuric acid is potassium dichloroisocyanurate.

References Cited
UNITED STATES PATENTS

| | | | |
|---|---|---|---|
| 3,474,096 | 10/1969 | Kagawa | 260—248 |
| 3,668,204 | 6/1972 | Mesiah | 260—248 |

JOHN M. FORD, Primary Examiner